US012483007B2

(12) United States Patent
Schramm et al.

(10) Patent No.: US 12,483,007 B2
(45) Date of Patent: Nov. 25, 2025

(54) SPARK PLUG WITH SMALL SPARK GAP AND FLAT IGNITION ELEMENT SURFACES

(71) Applicant: Robert Bosch GmbH, Stuttgart (DE)

(72) Inventors: Alexander Schramm, Knetzgau (DE); Andreas Benz, Bamberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/702,431

(22) PCT Filed: Nov. 21, 2022

(86) PCT No.: PCT/EP2022/082641
§ 371 (c)(1),
(2) Date: Apr. 18, 2024

(87) PCT Pub. No.: WO2023/104487
PCT Pub. Date: Jun. 15, 2023

(65) Prior Publication Data

US 2024/0413616 A1 Dec. 12, 2024

(30) Foreign Application Priority Data

Dec. 10, 2021 (DE) ..................... 10 2021 214 150.1

(51) Int. Cl.
*H01T 13/32* (2006.01)
*H01T 13/46* (2006.01)

(52) U.S. Cl.
CPC ............. *H01T 13/32* (2013.01); *H01T 13/46* (2013.01)

(58) Field of Classification Search
CPC ................................ H01T 13/46; H01T 13/54
See application file for complete search history.

(56) References Cited

U.S. PATENT DOCUMENTS

2006/0181185 A1* 8/2006 Yamanaka .............. H01T 13/32 313/144
2011/0148274 A1* 6/2011 Ernst ..................... H01T 13/467 313/141

(Continued)

FOREIGN PATENT DOCUMENTS

DE 4414545 A1 11/1994
DE 102004026253 A1 1/2005

(Continued)

OTHER PUBLICATIONS

International Search Report for PCT/EP2022/082641, Issued Mar. 1, 2023.

*Primary Examiner* — Tracie Y Green
(74) *Attorney, Agent, or Firm* — NORTON ROSE FULBRIGHT US LLP

(57) ABSTRACT

A spark plug with a longitudinal axis. The spark plug includes a housing; an insulator disposed at least partly inside the housing; a center electrode disposed at least partly inside the insulator and having a base body and a first ignition element; and at least one ground electrode disposed inside the housing and having a base body and a second ignition element. The ground electrode and the center electrode are disposed such they form a spark gap which extends radially with respect to the spark plug longitudinal axis. A surface of the first ignition element of the center electrode which serves as ignition surfaces and a surface of the second ignition element of the ground electrode which serves as ignition surfaces are flat surfaces. A width of the spark gap is not greater than 0.3 mm, and the spark gap is formed inside the housing.

9 Claims, 6 Drawing Sheets

(56) References Cited

U.S. PATENT DOCUMENTS

| | | | | |
|---|---|---|---|---|
| 2012/0125279 | A1* | 5/2012 | Hampson | H01T 13/54 445/7 |
| 2015/0028737 | A1* | 1/2015 | Alfonso | H01T 13/54 313/125 |

FOREIGN PATENT DOCUMENTS

| | | | |
|---|---|---|---|
| DE | 102004050291 | A1 | 6/2006 |
| DE | 102006000070 | A1 | 9/2006 |
| DE | 102010004851 | A1 | 6/2011 |
| DE | 102012202335 | A1 | 8/2013 |
| WO | 2013120632 | A1 | 8/2013 |
| WO | 2014149947 | A1 | 9/2014 |
| WO | 2022238038 | A1 | 11/2022 |

* cited by examiner

SPARK PLUG WITH SMALL SPARK GAP AND FLAT IGNITION ELEMENT SURFACES

FIELD

The present invention relates to a spark plug. The spark plug according to the present invention is in particular suitable for use in a hydrogen-powered engine.

BACKGROUND INFORMATION

To date, most vehicles, such as cars or trucks, have been powered by a combustion engine that uses gasoline or diesel as fuel. Now the number of mobile and stationary combustion engines that use natural gas or hydrogen as fuel is increasing. As with a gasoline-powered combustion engine, the air/fuel mixture in the hydrogen-powered combustion engine also has to be externally ignited. Typically, a spark plug is used for this purpose.

SUMMARY

Usually a very lean air/fuel mixture (lambda >1.8) is set in hydrogen-powered combustion engines, in order to comply with regulatory emission requirements. Together with the low mixture heating value of hydrogen, this results in higher charge densities and correspondingly higher pressures at the time of ignition. Another special feature of hydrogen combustion in a combustion engine is the interaction between the auto-ignition temperature and the minimum required ignition energy. Therefore a "cold spark plug" is required for use in a hydrogen-powered combustion engine, i.e., a spark plug with a very low heat value is needed.

The existing spark plugs are typically optimized for operation in a gasoline-powered combustion engine and are consequently not suitable for use or provide poor performance when used in hydrogen-powered combustion engines.

AN object of the present invention is to provide a spark plug that meets the requirements for a spark plug when used in a hydrogen-powered combustion engine.

This object may be achieved with the spark plug according to the present invention of the aforementioned type in that a surface of the first ignition element of the center electrode which serves as ignition surfaces and a surface of the second ignition element of the ground electrode which serves as ignition surfaces are flat surfaces, and in that a width of the spark gap is given by a spacing between the oppositely disposed ignition surfaces of the ground electrode and the center electrode, wherein the width of the spark gap is not greater than 0.3 mm and the spark gap is formed inside the housing.

A spark plug according to an example embodiment of the present invention with a longitudinal axis comprises a housing with a bore along the spark plug longitudinal axis X and a combustion chamber-side end face, an insulator, which is disposed at least partly inside the housing, a center electrode, which is disposed at least partly inside the insulator and comprises a base body and a first ignition element, and at least one ground electrode, which is disposed inside the housing and comprises a base body and a second ignition element. The at least one ground electrode and the center electrode are disposed such that the second ignition element of the at least one ground electrode and the first ignition element of the center electrode form a spark gap which extends radially with respect to the spark plug longitudinal axis X.

According to an example embodiment of the present invention, it is provided that a surface of the first ignition element of the center electrode which serves as ignition surfaces and a surface of the second ignition element of the ground electrode which serves as ignition surfaces are flat surfaces. This has the advantage that the electric field that develops between the ignition surfaces is uniform, as a result of which the wear on the ignition elements is even. The term "flat surface" means that the ignition surface is a level surface. According to the present invention, a width of the spark gap is furthermore given by a spacing between the oppositely disposed ignition surfaces of the ground electrode and the center electrode, wherein the width of the spark gap is not greater than 0.3 mm, and the spark gap is formed inside the housing. This has the advantage that less voltage is needed for ignition and the increase in the spark gap over the operating time of the spark plug is smaller. Since the installation space inside the housing is inherently limited, the small spark gap advantageously also makes it possible to dispose the electrodes, and thus also the spark gap, inside the housing. This results in the advantage that the electrodes do not project into the combustion chamber as much and therefore absorb less heat from the combustion chamber. The spark plug consequently absorbs less heat overall and is a cold spark plug, so that unwanted auto-ignition is avoided. Therefore the combination of the features according to the present invention is particularly advantageous.

Further advantageous embodiments of the present invention are disclosed herein.

In a further development of the spark plug according to the present invention, the base body of the center electrode comprises at least one recess at its combustion chamber-facing end in which the first ignition element is directly or indirectly disposed. This recess is configured radially on the base body of the center electrode, for example. The recess can be a blind hole or a flat surface.

In another further development of the present invention, the center electrode can comprise an intermediate piece, which is disposed on the base body in addition or as an alternative to the recess and on which the first ignition element is disposed, wherein in particular the intermediate piece is disposed in the recess of the center electrode or on the combustion chamber-side end face of the center electrode or on the combustion chamber-side end of the lateral surface of the center electrode. This has the advantage that the intermediate piece can be connected to the center electrode base body by means of resistance welding. This advantage is particularly effective if the base body and the intermediate piece are made of the same material. The intermediate piece is made of a Ni alloy, for example, and can have any geometric shape. If the intermediate piece is disposed in the recess of the base body and the first ignition element is disposed on the intermediate piece, then in this constellation the first ignition element is disposed indirectly, namely by means of the intermediate piece, in the recess of the base body.

In a further development of the present invention, the intermediate piece is a ring that is placed onto the base body of the center electrode and/or connected to the base body of the center electrode in a material-locking manner. This has the advantage that the intermediate piece can be positioned by means of rotation and/or axial displacement, so that the first ignition element disposed on the intermediate piece can be precisely aligned with the second ignition element disposed on the ground electrode. The intermediate piece can be fixed to the center electrode base body by means of a press fit or a welding method, for example. For instance, the base body can comprise a shoulder on which the ring rests after being placed onto the base body.

In an alternative further development of the present invention, the first ignition element of the center electrode is disposed on the combustion chamber-side end face of the base body and together with the second ignition element of the at least one ground electrode forms a radial spark gap. This has the advantage that a pin, which is easier to weld on than a disk, for example, can be used as the first ignition element. The pin can either be leveled after welding to the center electrode base body so that the first ignition element has at least one flat surface corresponding to the alignment with the at least one ground electrode. Or the first ignition element can alternatively also be preformed before it is attached to the base body. If there are multiple ground electrodes, the first ignition element then has multiple flat ignition surfaces. This has the advantage that only one first ignition element is needed.

According to an example embodiment of the present invention, the width of the spark gap is advantageously not greater than 0.2 mm, for instance, in particular not greater than 0.15 mm. The smaller the spark gap, the lower the voltage required to generate an ignition spark.

According to an example embodiment of the present invention, it is also advantageous that the width of the spark gap is at least 0.05 mm, in particular not less than 0.1 mm. The spark gap is therefore not too small. A very small spark gap poses particular challenges in terms of accuracy in spark plug production. A deviation from the ideally parallel alignment of the electrode ignition surfaces has a greater effect with a small spark gap, for example uneven wear on the ignition surface, than with a larger spark gap. The lower limit for the spark gap is therefore a good compromise between a small spark gap to reduce the ignition voltage requirement and wear, on the one hand, and, on the other hand, a justifiable amount of effort for a consistently good quality of the alignment of the ignition surfaces to one another during spark plug production.

In a further advantageous embodiment of the spark plug according to the present invention, the spacing between the spark gap and the combustion chamber-side end face of the housing is at least 0 mm and at most-15 mm, in particular not less than-1 mm and/or not greater than-4 mm. The spacing is preferably in a range between at least 0 mm and at most −15 mm, particularly preferably in a range between −1 mm and −4 mm. A plane subtended by the combustion chamber-side end face of the housing perpendicular to the longitudinal axis of the spark plug is a reference plane with the value 0 mm. The spacing from the reference plane takes on an increasingly negative value in the direction of the end of the spark plug facing away from the combustion chamber and an increasingly positive value in the direction of the combustion chamber.

The feature that the spacing between the spark gap and the combustion chamber-side end face of the housing is at least 0 mm means that the spark gap is disposed completely inside the housing, i.e., the spark plug has a negative spark position. This has the advantage that the electrodes are pulled as far as possible out of the combustion chamber and therefore absorb as little heat as possible from the combustion processes taking place in the combustion chamber. This makes it possible to obtain a spark plug that is as cold as possible.

In an advantageous further development of the present invention, it is provided that the spark plug comprises a plurality of ground electrodes which each have a second ignition element and the center electrode comprises a first ignition element for each ground electrode, wherein, in each case, a spark gap is formed between a ground electrode having a second ignition element and a first ignition element of the center electrode. Since the spark plug comprises a plurality of ground electrodes, the wear on the ignition elements can be distributed over a plurality of ground electrodes and the ignition elements of the individual ground electrode do not require as much volume of a wear-resistant material as when there is only one ground electrode. The service life of the spark plug is increased.

In a particularly advantageous embodiment of the present invention, the plurality of ground electrodes are disposed symmetrically on the inside of the housing. The longitudinal axis of the spark plug is the axis of symmetry for the arrangement of the ground electrodes. The symmetrical arrangement of the ground electrodes results in the technical effect that the flow of the fuel/air mixture within the breathing space is very uniform, which further promotes good ignition and good ignition stability of the fuel/air mixture in the spark plug.

In an advantageous further development of the spark plug of the present invention, the first ignition element of the center electrode and the second ignition element of the at least one ground electrode are made of a noble metal or a noble metal alloy, in particular Pt, Ir, Rh, Pd, Re, Au or an alloy thereof. An alloy with a high Ir content, i.e., Ir is the element with the highest individual content in the alloy, is particularly advantageous here. These elements or the alloy comprising these elements are particularly wear-resistant.

According to an example embodiment of the present invention, the ignition elements of the center electrode and the at least one ground electrode are advantageously aligned with their ignition surfaces in such a way that the projection of the ignition surfaces onto one another completely overlap in axial or radial direction, preferably in both directions.

The spark plug according to the present invention and its further development are a hydrogen spark plug, which is configured to be used in a hydrogen-powered engine and ignite the ignitable hydrogen-containing fuel/air mixture. The fuel can contain up to 100% hydrogen, i.e., the fuel can be hydrogen or a mixture of hydrogen and fuel gas.

But, the spark plug according to the present invention is not limited to operation with hydrogen. The spark plug according to the present invention can also be used for natural gas or gasoline combustion engines. The spark plug according to the present invention is optimized for operation with hydrogen, however.

The spark plug according to the present invention can furthermore also comprise a cap on the combustion chamber-side end face of the housing, which makes it a prechamber spark plug.

DETAILED DESCRIPTION OF EXAMPLE EMBODIMENTS

Figure 1:
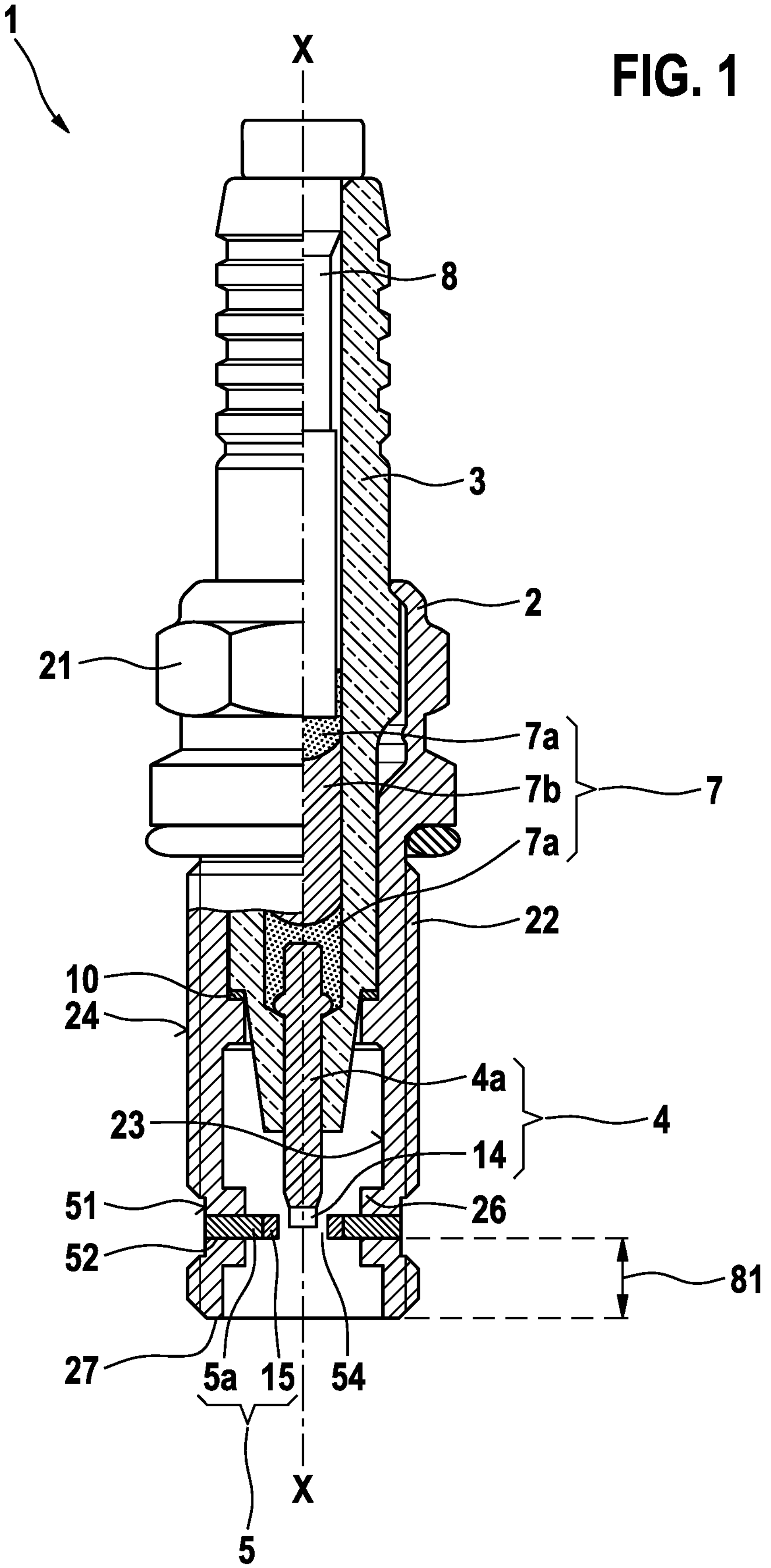
FIG. 1 shows an example of a spark plug according to the present invention as a whole.

FIG. 1 shows a spark plug 1 in a half-sectional view. The spark plug 1 comprises a housing 2. An insulator 3 is inserted into the housing 2. The housing 2 and the insulator 3 each have a bore along their longitudinal axis. The housing 2 has an outer side 24 and an inner side 23. The longitudinal axis of the housing 2, the longitudinal axis of the insulator 3 and the longitudinal axis X of the spark plug 1 coincide. A center electrode 4 is inserted into the insulator 3. A connecting bolt 8 for bringing the spark plug into electrical contact furthermore extends into the insulator 3 and brings the spark plug 1 into electrical contact with a voltage source. The electrical contact-connection forms the end of the spark plug 1 facing away from the combustion chamber. The electrical contact-connection can be configured in one piece, as in this example, or made of several components.

The housing 2 comprises a seat on its inner side. The insulator rests with its shoulder or insulator seat on the housing seat. An inner seal 10 is disposed between the insulator seat and the housing seat.

A resistance element 7 is disposed in the insulator 3 between the center electrode 4 and the connecting bolt 8 for bringing the spark plug into electrical contact. The resistance element 7 connects the center electrode 4 to the connecting bolt 8 in an electrically conductive manner. The resistance element 7 is structured as a layer system consisting of a first contact layer 7*a*, a resistance layer 7*b* and a second contact layer 7*a*, for example. The layers of the resistance element differ by their material composition and the resulting electrical resistance. The first contact layer 7*a* and the second contact layer 7*a* can have a different or the same electrical resistance.

In this example, two ground electrodes 5 are disposed in a respective bore 52 on the inner side 23 of the housing 2, so that the ground electrodes 5 project radially from the inner side 23 of the housing into the bore along the longitudinal axis X of the housing 2. The ground electrodes 5 and the center electrode 4 together form a respective spark gap 54. The respective spark gap 54 between the center electrode 4 and the respective ground electrode 5 extends radially to the longitudinal axis x. The width of the respective spark gap 54 is the spark gap and is in the range of 0.05 mm to 0.3 mm. The bores 52 extend from the outer side 24 through the housing wall to the inner side 23 of the housing 2.

The center electrode 4 comprises a base body 4*a* and a first ignition element 14. The first ignition element 14 has a surface which serves as an ignition surface 114. This ignition surface 114 is a flat surface and faces a ground electrode 5. The first ignition element 14 is either disposed on the base body 4*a* of the center electrode 4 directly or indirectly by means of an intermediate piece, which is disposed on the base body 4*a* of the center electrode 4 and on which the first ignition element 14 is disposed.

Each ground electrode 5 comprises a base body 5*a* and a second ignition element 15. The second ignition element 15 has a surface which serves as an ignition surface 115. This ignition surface 115 is a flat surface and faces the center electrode 4.

The spark plug 1 can alternatively also comprise only one or more than two ground electrodes 5.

In this example according to FIG. 1, there is a respective spark gap 54 between the center electrode 4 and the two ground electrodes 5. In this example, the projections of the first ignition surface 114 of the center electrode 4 and the respective second ignition surface 115 of the ground electrodes 5 do not completely overlap. Ideally, the projections overlap, as shown in the following figures. The combustion chamber-side end of the spark gap lies in a plane perpendicular to the longitudinal axis X with the combustion chamber-side end surface of the center electrode 4. The spacing 81 between the spark gap and the plane subtended by the combustion chamber-side end face 27 of the housing 2 perpendicular to the longitudinal axis X here is greater than 0 and equal to or less than-15 mm.

The housing 2 comprises a shaft. A polygon 21, a shrink groove and a thread 22 are formed on this shaft. The thread 22 is used to screw the spark plug 1 into an engine.

The bores 52 in the housing wall are formed in the region of the thread 22. The bore 52 for the ground electrodes 5, and thus also the ground electrodes 5, can be disposed at any height in the region of the thread 22. Depending on the position of the ground electrodes 5 in the region of the thread 22, the center electrode 4, and with it also the insulator base, projects more or less far into the breathing space. The position of the bores in the region of the thread 22 and the ground electrodes 5 on the inner side 23 of the housing 2 can be selected depending on the desired intended use of the spark plug 1.

If the thread 22 on the housing outer side 24 is not configured as far as the combustion chamber-side end of the housing 2, so that there is a non-threaded region on the outer side 24 of the combustion chamber-side end of the housing 2, the bore 52 for the ground electrode 5 can also be configured in the housing wall in the region of the non-threaded region.

The bores 52 are each disposed in a recess 51, such as a conical or round groove, for instance. The outer diameter of the housing 2 in the recesses is smaller than the core diameter of the thread 22.

The recesses 51 can be created by punching the housing 2 during the production of the spark plug 1, for example. This not only reduces the outer diameter of the housing 2 in the region of the recesses 51, but also the inner diameter of the housing 2 in the region of the recesses 51, so that a projection is created inside the housing for each recess 51.

The housing 2 or the bores 52 for the ground electrodes 5 can have grooves or furrows from production, which results in a surface roughness. The grooves and furrows are created when the bore on or in the housing 2 are machined with a turning process in which material is removed from the housing 2, for instance.

The following pictures show various designs of the center electrode according to the present invention. For the sake of clarity, not all components in a figure are always marked with reference signs. The same or similar components do, however, have the same reference sign between two figures. In the following figures, the respective differences to the previous figures are discussed.

Figure 2:
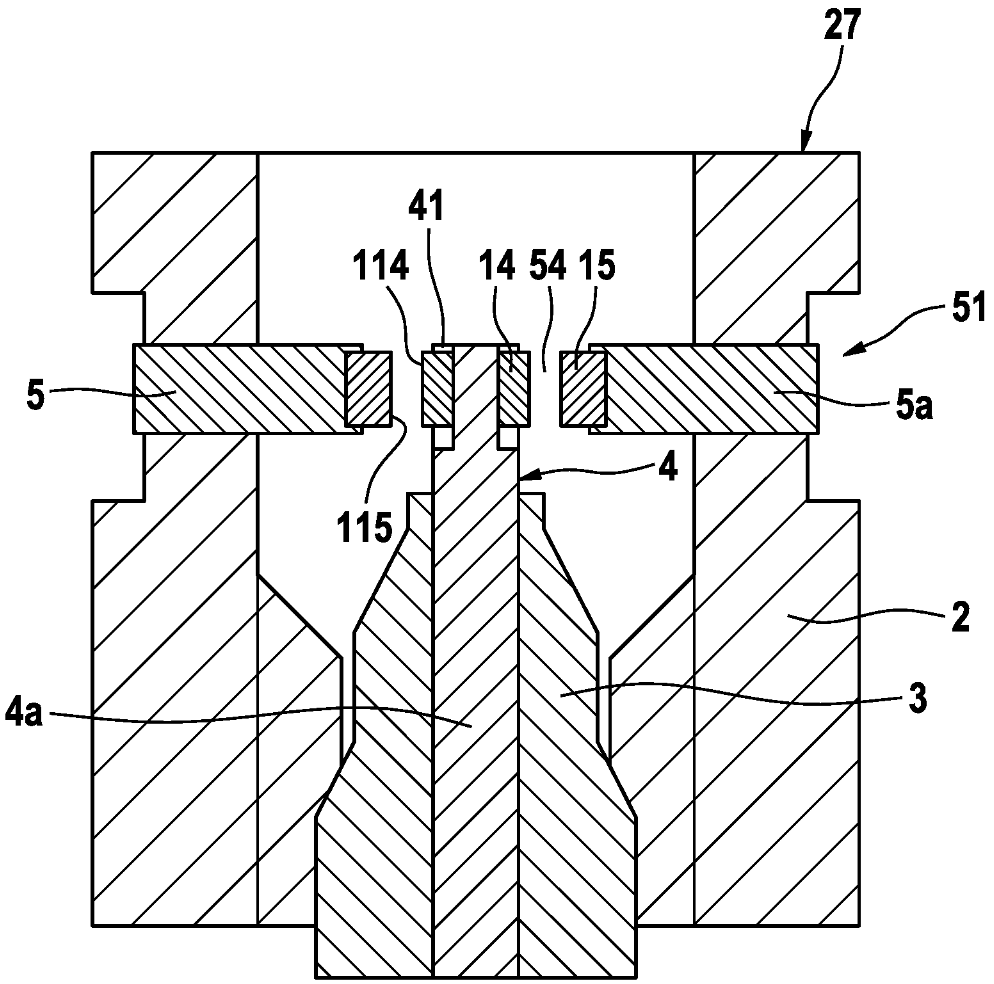
FIG. 2 shows a second example of a spark plug according to the present invention with a first ignition element disposed in a recess in the center electrode base body.

FIG. 2 shows a second example of the spark plug 1 according to the present invention, wherein the focus is on the arrangement and design of the electrodes. The center electrode 4 has a base body 4*a*, which comprises one or more recesses 41 at its combustion chamber-side end. A first ignition element 14 is disposed in each recess 41. The first ignition element is welded radially into the recess 41. The recess 41 can, for instance, be a blind hole or a flat surface or a groove. The first ignition element 14 can either be welded to the base body 4*a* of the center electrode 4 in the recess 41 or melted into the recess 41 and alloyed with the material of the base body 4*a*. The first ignition element 14 always has a flat surface, which faces the ground electrode 5 and serves as an ignition surface 114.

Each ground electrode 5 comprises a base body 5*a* and a second ignition element 15. The second ignition element 15 is welded onto the base body 5*a* of the ground electrode, for example. The second ignition element 15 has a flat surfaces, which faces the center electrode 4 and serves as an ignition surface 115.

The ignition surfaces 114, 115 of the center electrode and the ground electrode together form a radial spark gap 54, which has a spacing of at least 0.05 mm and at most 0.3 mm. The spacing 81 between the spark gap 54 and the combustion chamber-side end face of the housing is at least 0 mm and at most 15 mm.

In this example, the spark plug 1 comprises two ground electrodes 5 and a center electrode 4 with two first ignition elements 14, as a result of which there are two radial spark gaps 54. The spark plug can alternatively also comprise only one ground electrode 5 and only one spark gap 54, or also more than two ground electrodes 5 and spark gap 54.

Figure 3:
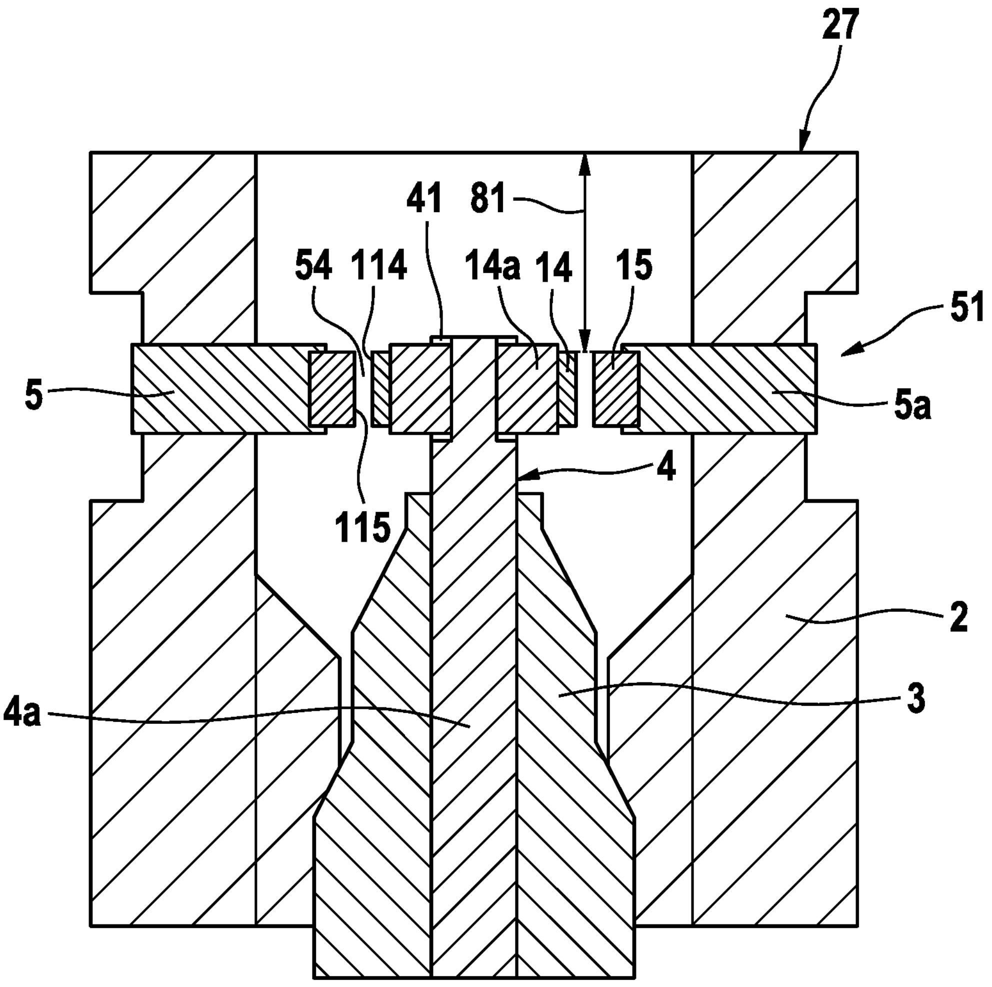
FIG. 3 shows a third example of a spark plug according to the present invention with an intermediate piece disposed in a recess in the center electrode base body on which the first ignition element is disposed.

The third embodiment example shown in FIG. 3 differs from the second embodiment example in that the center electrode comprises an intermediate element 14*a* in addition to the base body 4*a* and the first ignition element 14. The first ignition element 14 is disposed on the intermediate element 14*a* and is welded on, for example. The intermediate piece 14*a* is disposed in the recess 41 of the base body 4*a* of the center electrode. The intermediate element 14*a* is made of the same material as the base body 4*a*, for example, which makes it easy to connect the intermediate piece 14*a* to the base body 4*a* by means of resistance welding.

Figure 4:
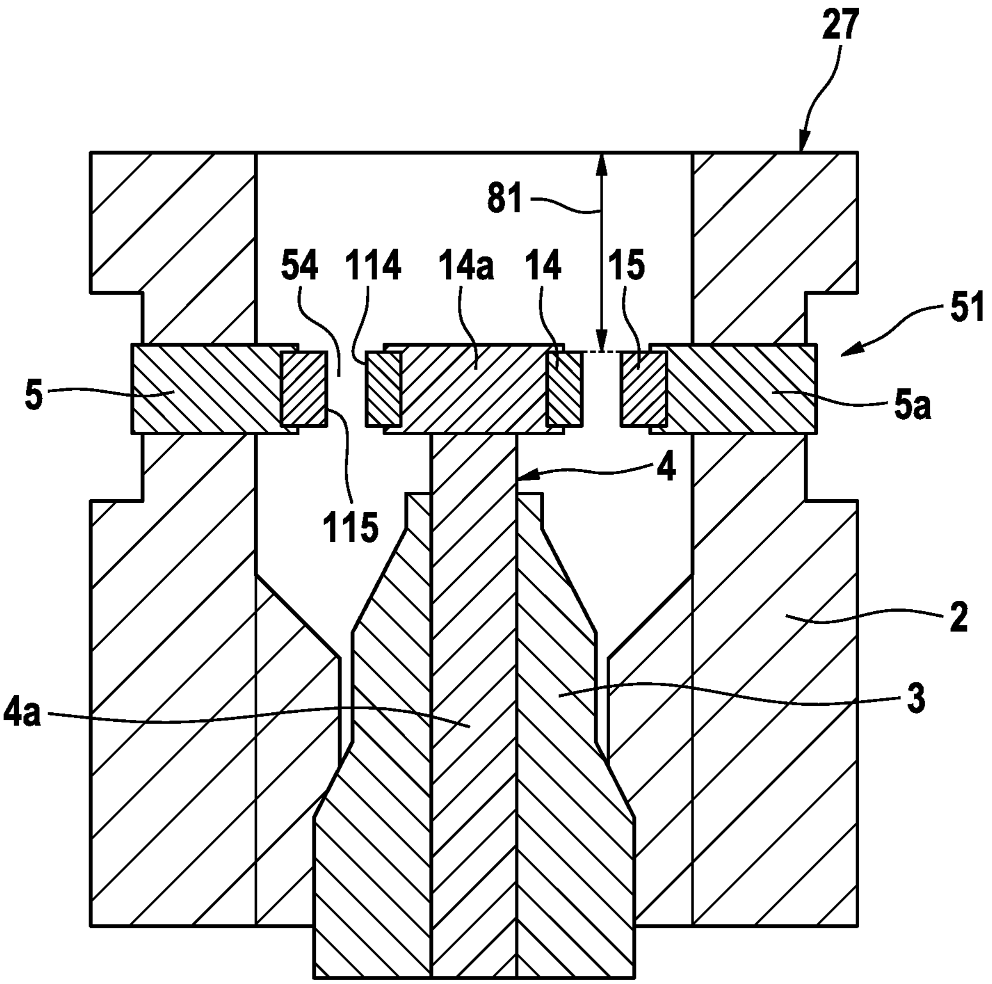
FIG. 4 shows a fourth example of a spark plug according to the present invention with an intermediate piece disposed on the end face of the center electrode base body on which the first ignition element is disposed.

FIG. 4 shows a fourth embodiment example. This differs from the above-described examples in that the intermediate piece 14*a* is disposed on the combustion chamber-side end face of the base body 4*a* of the center electrode 4. More than one first ignition element 14 can now be disposed on the intermediate piece 14*a*. This reduces the number of assembly and welding steps.

Figure 5:
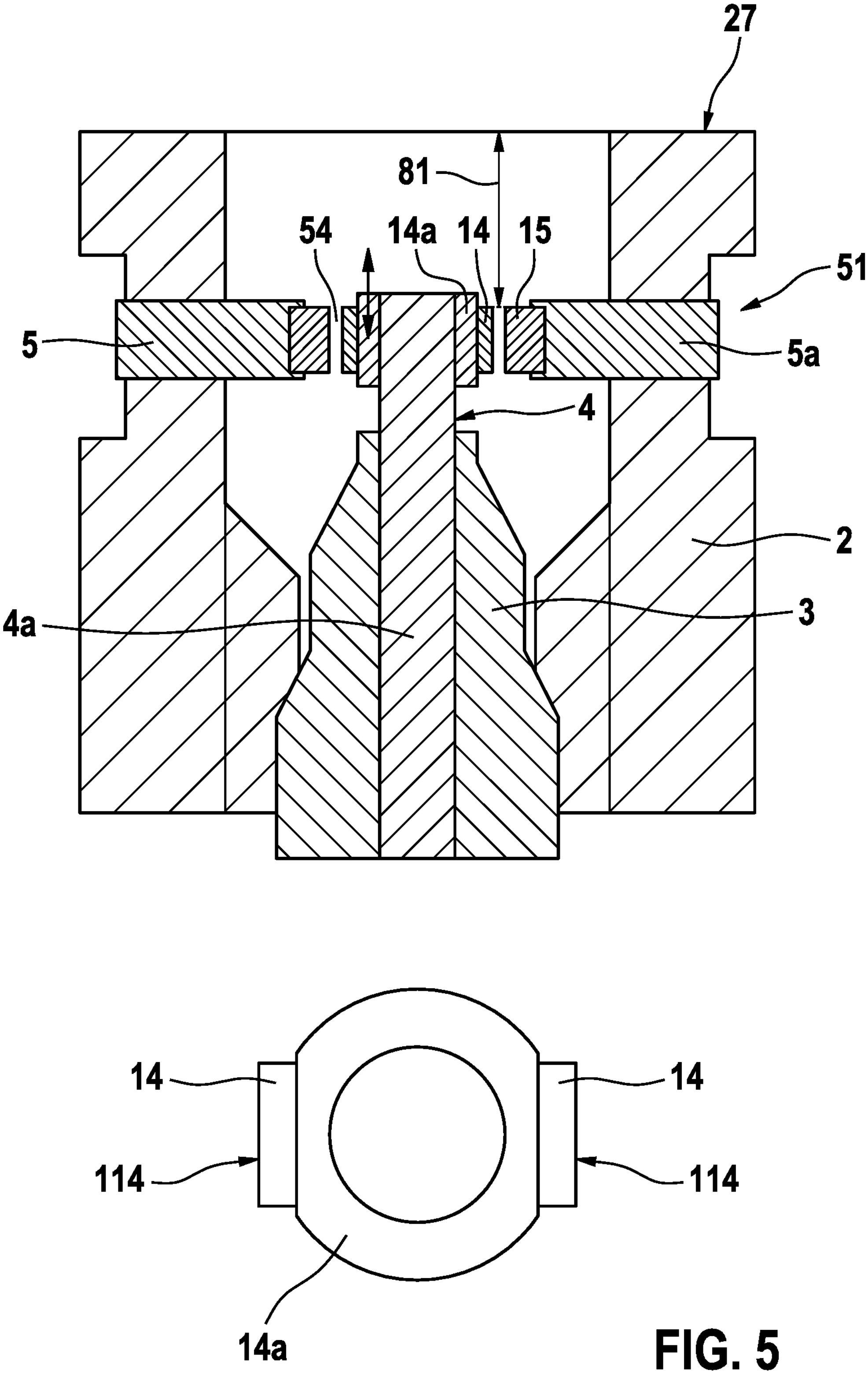
FIG. 5 shows a fifth example of a spark plug according to the present invention with a ring as an intermediate piece.

FIG. 5 shows a fifth embodiment example. This differs from the above-described examples in that the intermediate piece 14*a* is a ring that is placed onto the base body 4*a* of the center electrode 4. The ring can be moved along the longitudinal axis of the center electrode 4*a* or rotated about the longitudinal axis for positioning. After positioning, the ring is fixed in its position by means of a press fit or a weld.

The lower half of FIG. 5 shows a plan view onto the intermediate piece 14*a* with the first ignition elements 14 disposed upon it.

Figure 6:
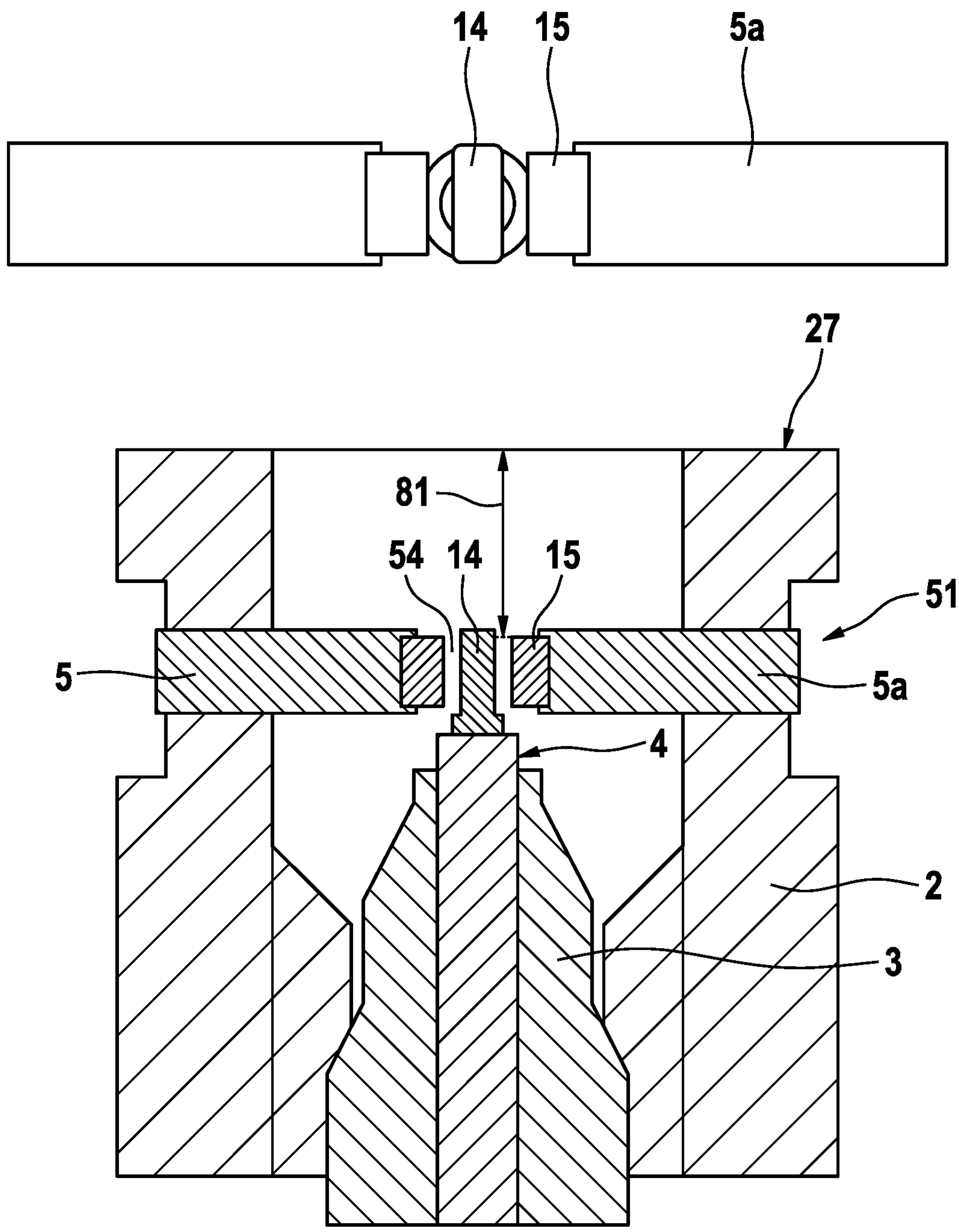
FIG. 6 shows a sixth example of a spark plug according to the present invention with a first ignition element disposed on the end face of the center electrode base body.

FIG. 6 shows a sixth embodiment example. This differs from the above-described examples in that the first ignition element 14 is disposed directly on the combustion chamber-side end face of the base body 4*a* of the center electrode 4. The upper half of FIG. 6 again shows the electrode arrangement in plan view.

In this example with two ground electrodes 5, the first ignition element 14 accordingly comprises two flat ignition surfaces 114, each of which faces a ground electrode 5 with its second ignition element 15 and a flat ignition surface 115.

The invention claimed is:

1. A spark plug with a longitudinal axis, comprising:

a housing with a bore along the spark plug longitudinal axis and a combustion-chamber-side end face;

an insulator disposed at least partly inside the housing;

a center electrode disposed at least partly inside the insulator and having a base body and a first ignition element; and at least one ground electrode that is disposed inside the housing and has a base body and a second ignition element, wherein the at least one ground electrode and the center electrode are disposed such that the second ignition element of the at least one ground electrode and the first ignition element of the center electrode form a spark gap which extends radially with respect to the spark plug longitudinal axis, wherein a surface of the first ignition element of the center electrode which serves as ignition surfaces and a surface of the second ignition element of the ground electrode which serves as ignition surfaces are flat surfaces, and wherein a width of the spark gap is given by a spacing between oppositely disposed ignition surfaces of the ground electrode and the center electrode, wherein the width of the spark gap is not greater than 0.3 mm, and the spark gap is formed inside the housing, wherein the base body of the center electrode includes at least one recess at a combustion chamber-facing end, in which the first ignition element is directly disposed by welding or melting or indirectly disposed on an intermediate piece positioned within the recess, wherein the recess is a blind hole, a flat surface, or a groove configured radially on the base body.

2. The spark plug according to claim 1, wherein the center electrode includes an intermediate piece which is disposed on the base body of the center electrode and on which the first ignition element is disposed, wherein the intermediate piece is disposed in the recess of the center electrode or on the combustion chamber-side end face of the center electrode or on a combustion chamber-side end of a lateral surface of the center electrode.

3. The spark plug according to claim 2, wherein the intermediate piece is a ring that is placed onto the base body of the center electrode and/or connected to the base body of the center electrode in a material-locking manner.

4. The spark plug according to claim 1, wherein the first ignition element of the center electrode is disposed on the combustion chamber-side end face of the base body of the center electrode and together with the second ignition element of the at least one ground electrode forms a radial spark gap.

5. The spark plug according to claim 1, characterized in that the width of the spark gap is not greater than 0.2 mm and is at least 0.05 mm.

6. The spark plug according to claim 1, wherein a spacing between the spark gap and the combustion chamber-side end face of the housing (2) is at least 0 mm and at most-15 mm, wherein a plane subtended by the combustion chamber-side end face of the housing perpendicular to the longitudinal axis of the spark plug is a reference plane with a value of 0 mm and a spacing from the reference plane in a direction of an end of the spark plug facing away from the combustion chamber takes on an increasingly negative value.

7. The spark plug according to claim 1, further comprising:

a plurality of ground electrodes which each have a second ignition element;

wherein the center electrode includes a first ignition element for each ground electrode, wherein, in each case, a spark gap is formed between a ground electrode having a second ignition element and a first ignition element of the center electrode, and wherein the ground electrodes are arranged symmetrically inside the housing.

8. The spark plug according to claim 1, wherein the first ignition element of the center electrode and the second ignition element of the at least one ground electrode are made of a noble metal or a noble metal alloy, including Pt or Ir or Rh or Pd or Re or Au or an alloy of Pt or Ir or Rh or Pd or Re or Au.

9. The spark plug according to claim 1, wherein the spark plug is a hydrogen spark plug which is configured to be used in a hydrogen-powered engine and ignite an ignitable hydrogen-containing fuel/air mixture.

* * * * *